US012656275B2

(12) United States Patent (10) Patent No.: US 12,656,275 B2
Damiano et al. (45) Date of Patent: Jun. 16, 2026

(54) METHOD FOR AUTOMATICALLY SETTING UP COMPUTED TOMOGRAPHY SCAN PARAMETERS

(71) Applicant: Lumafield, Inc., Cambridge, MA (US)

(72) Inventors: Adam P. Damiano, Somerville, MA (US); Kevin David Cedrone, Boxborough, MA (US)

(73) Assignee: Lumafield, Inc., Cambridge, MA (US)

( * ) Notice: Subject to any disclaimer, the term of this patent is extended or adjusted under 35 U.S.C. 154(b) by 196 days.

(21) Appl. No.: 18/240,846

(22) Filed: Aug. 31, 2023

(65) Prior Publication Data

US 2024/0077434 A1 Mar. 7, 2024

Related U.S. Application Data

(60) Provisional application No. 63/403,161, filed on Sep. 1, 2022.

(51) Int. Cl.
*G01N 23/046* (2018.01)
*G06T 12/10* (2026.01)

(52) U.S. Cl.
CPC .......... *G01N 23/046* (2013.01); *G06T 12/10* (2026.01); *G01N 2223/1016* (2013.01); *G01N 2223/303* (2013.01); *G01N 2223/306* (2013.01); *G01N 2223/323* (2013.01); *G01N 2223/401* (2013.01); *G01N 2223/419* (2013.01); *G01N 2223/423* (2013.01)

(58) Field of Classification Search
CPC ......... G01N 23/046; G01N 2223/1016; G01N 2223/303; G01N 2223/306; G01N 2223/323; G01N 2223/401; G01N 2223/419; G01N 2223/423; G06T 11/005
See application file for complete search history.

(56) References Cited

U.S. PATENT DOCUMENTS

| | | | |
|---|---|---|---|
| 6,381,299 | B1 | 4/2002 | Baba et al. |
| 7,920,670 | B2 | 4/2011 | Hugg et al. |
| 8,280,135 | B2 | 10/2012 | McCollough et al. |
| 8,811,707 | B2 | 8/2014 | Jackson et al. |
| 9,636,077 | B2 | 5/2017 | Braun et al. |
| 9,959,640 | B2 | 5/2018 | Koehler et al. |
| 9,968,307 | B2 | 5/2018 | Stevens et al. |

(Continued)

FOREIGN PATENT DOCUMENTS

WO WO-2020121270 A1 * 6/2020 ............... A61B 1/24

OTHER PUBLICATIONS

International Search Report and Written Opinion in International Appln. No. PCT/US2023/031728, mailed on Jan. 23, 2024, 20 pages.

(Continued)

*Primary Examiner* — Uzma Alam
*Assistant Examiner* — Mamadou Faye
(74) *Attorney, Agent, or Firm* — Fish & Richardson P.C.

(57) ABSTRACT

Systems, methods, apparatuses, and computer program products for nonintrusive scanning of objects using x-ray electromagnetic radiation. One method may include adjusting, by a computed tomography scanning device, at least one operation parameter including a grey value threshold based upon a material composition of a scan target; and collecting, by the computed tomography scanning device, at least one x-ray frame of the scan target based upon the at least one adjusted operation parameter.

24 Claims, 6 Drawing Sheets

(56) References Cited

U.S. PATENT DOCUMENTS

| | | | |
|---|---|---|---|
| 9,984,476 B2 | 5/2018 | Hsieh et al. | |
| 10,079,072 B2 | 9/2018 | Lou et al. | |
| 10,265,044 B2 | 4/2019 | Profio et al. | |
| 10,470,738 B2 | 11/2019 | Feuerlein et al. | |
| 10,524,758 B2 | 1/2020 | Jan et al. | |
| 11,096,649 B2 | 8/2021 | Takemoto | |
| 11,189,045 B2 * | 11/2021 | Chen | G06T 7/62 |
| 2005/0243414 A1 * | 11/2005 | Masuyama | H04N 25/63 |
| | | | 348/E5.038 |
| 2007/0258122 A1 | 11/2007 | Chamgoulov et al. | |
| 2008/0187095 A1 * | 8/2008 | Boone | A61B 8/0825 |
| | | | 378/37 |
| 2008/0253509 A1 * | 10/2008 | Schlomka | G01V 5/222 |
| | | | 378/19 |
| 2011/0000068 A1 * | 1/2011 | Kenneally | D06F 58/203 |
| | | | 29/428 |
| 2011/0315881 A1 * | 12/2011 | Knowles | H04N 25/68 |
| | | | 250/340 |
| 2015/0078512 A1 * | 3/2015 | Goderer | G01T 1/36 |
| | | | 378/207 |
| 2015/0092084 A1 * | 4/2015 | Lee | H04N 23/56 |
| | | | 348/234 |
| 2017/0109882 A1 | 4/2017 | Case et al. | |
| 2018/0025510 A1 | 1/2018 | Chen et al. | |
| 2018/0140260 A1 * | 5/2018 | Taguchi | A61B 6/032 |
| 2018/0211416 A1 | 7/2018 | Chen et al. | |
| 2018/0263583 A1 | 9/2018 | Rintamaki et al. | |
| 2019/0333238 A1 * | 10/2019 | Nam | A61B 5/1079 |
| 2023/0148975 A1 | 5/2023 | Damiano et al. | |
| 2023/0175988 A1 * | 6/2023 | Gondrom-Linke | A61B 6/586 |
| | | | 378/207 |

OTHER PUBLICATIONS

Ketcham et al., "Acquisition, optimization and interpretation of X-ray computed tomographic imagery: applications to the geosciences," Computers & Geosciences, May 1, 2001, 27(4):381-400.

Nishiki, "Evaluation of the effective focal spot size of X-ray tubes by utilizing the edge response analysis," Presented at Conference on Medical Imaging 2015—Physics of Medical Imaging, Orlando, FL, Feb. 22-25, 2015; Proceedings of the SPIE, Mar. 18, 2015, 9412: 1-11 (Article # 94123Z).

Schena et al., "Detecting microdiamonds in kimberlite drill-hole cores by computed tomography," International Journal of Mineral Processing, Feb. 7, 2005, 75(3-4):173-188.

\* cited by examiner

METHOD FOR AUTOMATICALLY SETTING UP COMPUTED TOMOGRAPHY SCAN PARAMETERS

CROSS-REFERENCE TO RELATED APPLICATIONS

This patent application claims priority to and the benefit of U.S. Provisional Patent Application No. 63/403,161, filed on Sep. 1, 2022, which is incorporated herein by reference in its entirety.

TECHNICAL FIELD

Some example embodiments may generally relate to the detection of x-ray electromagnetic radiation using scanning devices, scintillators, and x-ray sources. For example, certain example embodiments may relate to systems and/or methods for nonintrusive scanning of objects using x-ray electromagnetic radiation.

BACKGROUND

X-ray devices, such as computed tomography (CT) devices, may be used to detect defects and/or damage in an object without disassembling the object. However, current x-ray detection equipment is in need of improvements because they can be cost-prohibitive for certain analyses, too large or bulky to be used in certain situations, unable to form images of an object's interior with the appropriate resolution, or other problems known in the field. Set forth herein are solutions to these and other problems known in the field.

SUMMARY

In accordance with certain example embodiments, a method may include adjusting at least one operation parameter based upon a material composition of a scan target. The method may further include calculating an exposure duration parameter per frame based on a total number of frames and a total time elapsed while collecting the frames. The method may further include collecting at least one x-ray frame of the scan target based upon the at least one adjusted operation parameter and the calculated exposure duration parameter.

In accordance with some example embodiments, the method may further include setting at least one of a source beam energy parameter to a predefined maximum value.

In accordance with various example embodiments, the method may further include setting a camera gain parameter to a high value based upon a predetermined threshold value.

In accordance with certain example embodiments, the method may further include positioning and magnifying an image of a scan target according to an object detection algorithm.

In accordance with some example embodiments, the method may further include determining whether the scan target is mono-material or multi-material.

In accordance with various example embodiments, the method may further include determining whether a minimum effective grey value associated with an image of the scan target is greater than a grey value threshold.

In accordance with certain example embodiments, the method may further include, upon determining that a filtration parameter is set to a maximum filtration value, or that a minimum effective grey value is greater than a grey value threshold, determining whether a focal spot is static or dynamic.

In accordance with some example embodiments, the method may further include decreasing a source beam current parameter until $$\text{Focal spot size} \leq \frac{\text{Pixel size}}{\text{Magnification} - 1}$$

is satisfied.

In accordance with various example embodiments, the method may further include calculating a source beam current parameter until $$\text{Focal spot size} \leq \frac{\text{Pixel size}}{\text{Magnification} - 1}$$

is satisfied.

In accordance with certain example embodiments, the method may further include calculating an exposure duration per frame based on at least one of a total number of frames and a total time elapsed while collecting the frames.

In accordance with some example embodiments, the method may further include determining whether the exposure duration per frame is greater than a maximum exposure duration per frame threshold.

In accordance with various example embodiments, the method may further include, in response to determining that an exposure duration per frame is not greater than a maximum exposure duration per frame threshold, determining whether the exposure duration per frame is less than a minimum exposure limit threshold.

In accordance with certain example embodiments, the method may further include, in response to determining that an exposure duration per frame is not greater than a maximum exposure duration per frame threshold, determining whether the exposure duration per frame is less than a minimum exposure limit threshold.

In accordance with some example embodiments, the method may further include tuning camera gain to set an effective maximum grey value to an effective maximum grey value threshold.

In accordance with various example embodiments, the method may further include determining whether camera gain satisfies an effective maximum grey value.

In accordance with certain example embodiments, the method may further include determining whether a total number of projections is less than a maximum total number of projections threshold.

In accordance with some example embodiments, the method may further include, in response to determining that the total number of projections is less than the maximum total number of projections threshold, calculating any of a noise optimal distribution of scan projections, bright flat-field correction projections, and dark flat-field correction projections based on the total number of projections.

In accordance with various example embodiments, the method may further include scanning a scan target according to at least one determined parameter.

In accordance with some example embodiments, a method may include adjusting, by a computed tomography scanning device, at least one operation parameter based upon a material composition of a scan target. The method may further include calculating, by the computed tomography scanning device, an exposure duration parameter per frame based on a total number of frames and a total time elapsed while collecting the frames. The method may further include collecting, by the computed tomography scanning device, at least one x-ray frame of the scan target based upon the at least one adjusted operation parameter and the calculated exposure duration parameter.

In accordance with certain example embodiments, an apparatus may include means for adjusting at least one operation parameter based upon a material composition of a scan target. The apparatus may further include means for calculating an exposure duration parameter per frame based on a total number of frames and a total time elapsed while collecting the frames. The apparatus may further include means for collecting at least one x-ray frame of the scan target based upon the at least one adjusted operation parameter and the calculated exposure duration parameter.

In accordance with various example embodiments, a non-transitory computer readable medium may be encoded with instructions that may, when executed in hardware, perform a method. The method may include adjusting at least one operation parameter based upon a material composition of a scan target. The method may further include calculating an exposure duration parameter per frame based on a total number of frames and a total time elapsed while collecting the frames. The method may further include collecting at least one x-ray frame of the scan target based upon the at least one adjusted operation parameter and the calculated exposure duration parameter.

In accordance with some example embodiments, a computer program product may perform a method. The method may include adjusting at least one operation parameter based upon a material composition of a scan target. The method may further include calculating an exposure duration parameter per frame based on a total number of frames and a total time elapsed while collecting the frames. The method may further include collecting at least one x-ray frame of the scan target based upon the at least one adjusted operation parameter and the calculated exposure duration parameter.

In accordance with certain example embodiments, an apparatus may include at least one processor and at least one memory including computer program code. The at least one memory and the computer program code may be configured to, with the at least one processor, cause the apparatus to at least adjust at least one operation parameter based upon a material composition of a scan target. The at least one memory and the computer program code may be further configured to, with the at least one processor, cause the apparatus to at least calculate an exposure duration parameter per frame based on a total number of frames and a total time elapsed while collecting the frames. The at least one memory and the computer program code may be further configured to, with the at least one processor, cause the apparatus to at least collect at least one x-ray frame of the scan target based upon the at least one adjusted operation parameter and the calculated exposure duration parameter.

In accordance with various example embodiments, an apparatus may include circuitry configured to adjust at least one operation parameter based upon a material composition of a scan target. The circuitry may further be configured to calculate an exposure duration parameter per frame based on a total number of frames and a total time elapsed while collecting the frames. The circuitry may further be configured to collect at least one x-ray frame of the scan target based upon the at least one adjusted operation parameter and the calculated exposure duration parameter.

BRIEF DESCRIPTION OF THE DRAWINGS

For a proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for nonintrusive scanning of objects using x-ray electromagnetic radiation is not intended to limit the scope of certain example embodiments, but is instead representative of selected example embodiments.

In CT scanning technology, and as used throughout this disclosure, "projection" may refer to images used as input to a reconstruction algorithm, while a "frame" may refer to an image captured by a detector. At a setting of one frame per projection, a projection may include a single frame. When the frames per projection are increased, multiple images may be taken, which may then be averaged together into a single projection.

Certain example embodiments described herein may have various benefits and/or advantages to overcome the disadvantages described above. For example, certain example embodiments may improve the quality of images of an object's interior with the appropriate resolution. In some implementations, the systems and techniques can improve contrast-to-noise ratio of CT reconstruction images. In some implementations, the systems and techniques can reduce one or more artifacts in the CT reconstruction images, e.g., reducing the beam hardening artifact. Furthermore, various autotuning methods may improve the resolvability of fine features on both the interior and exterior of scanned objects, improve the discernibility of different materials in multi-material scanned objects, improve dimensional accuracy measurements, and decrease artifacts related to beam hardening. Some example embodiments may also lead to time-optimal scans, wherein the auto-tuning can achieve a given scan quality in a one-hour scan that would otherwise require 2 hours. Various example embodiments may improve setting beam energy parameters, setting filtration amounts, and identifying a mono-material versus a multi-material characteristic of a scanned part. Thus, certain example embodiments discussed below are directed to improvements in computer-related technology.

Figure 1A:
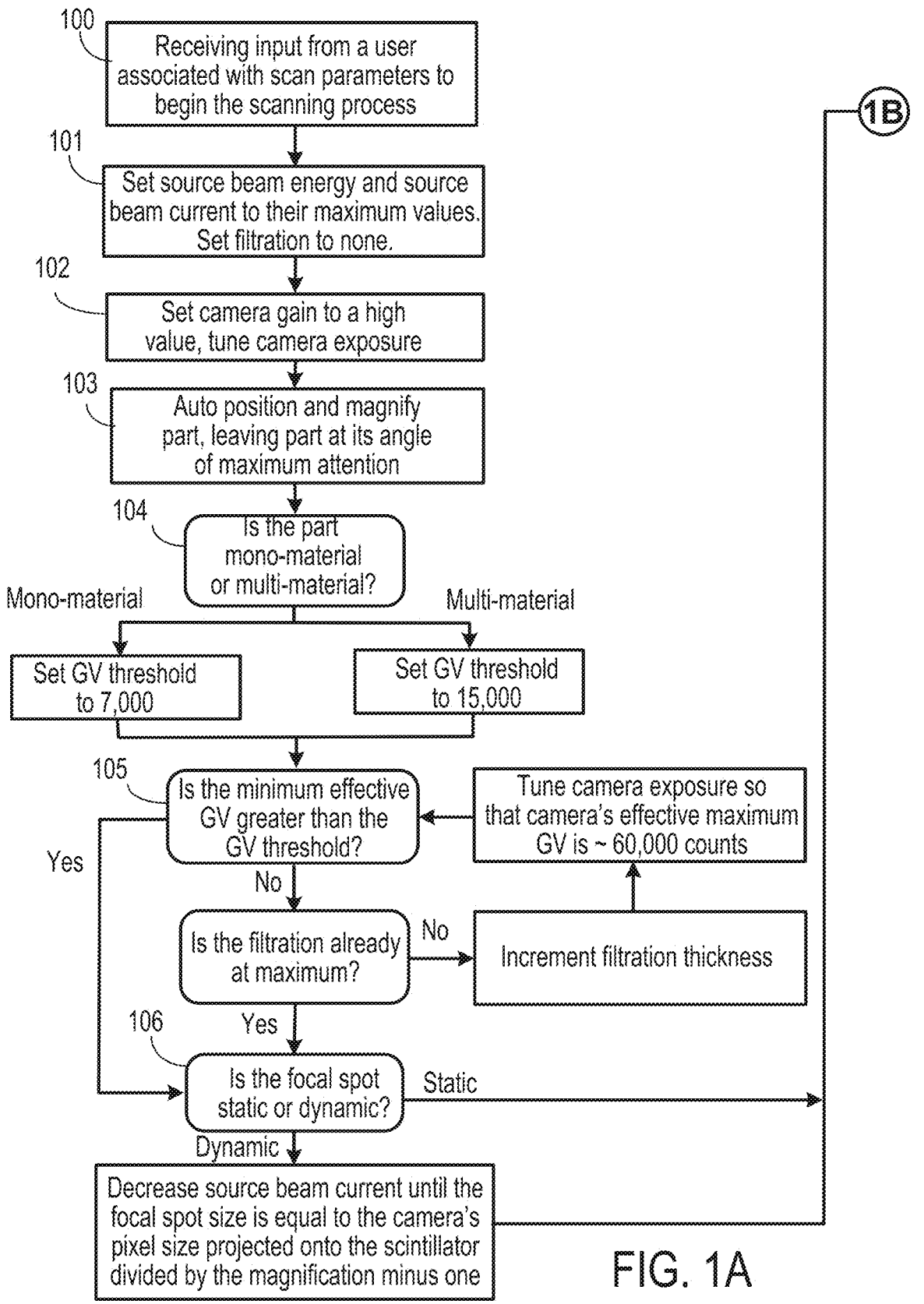
FIGS. 1(a)-(c) illustrate an example of a flow diagram of a method according to various example embodiments.
Figure 1B:
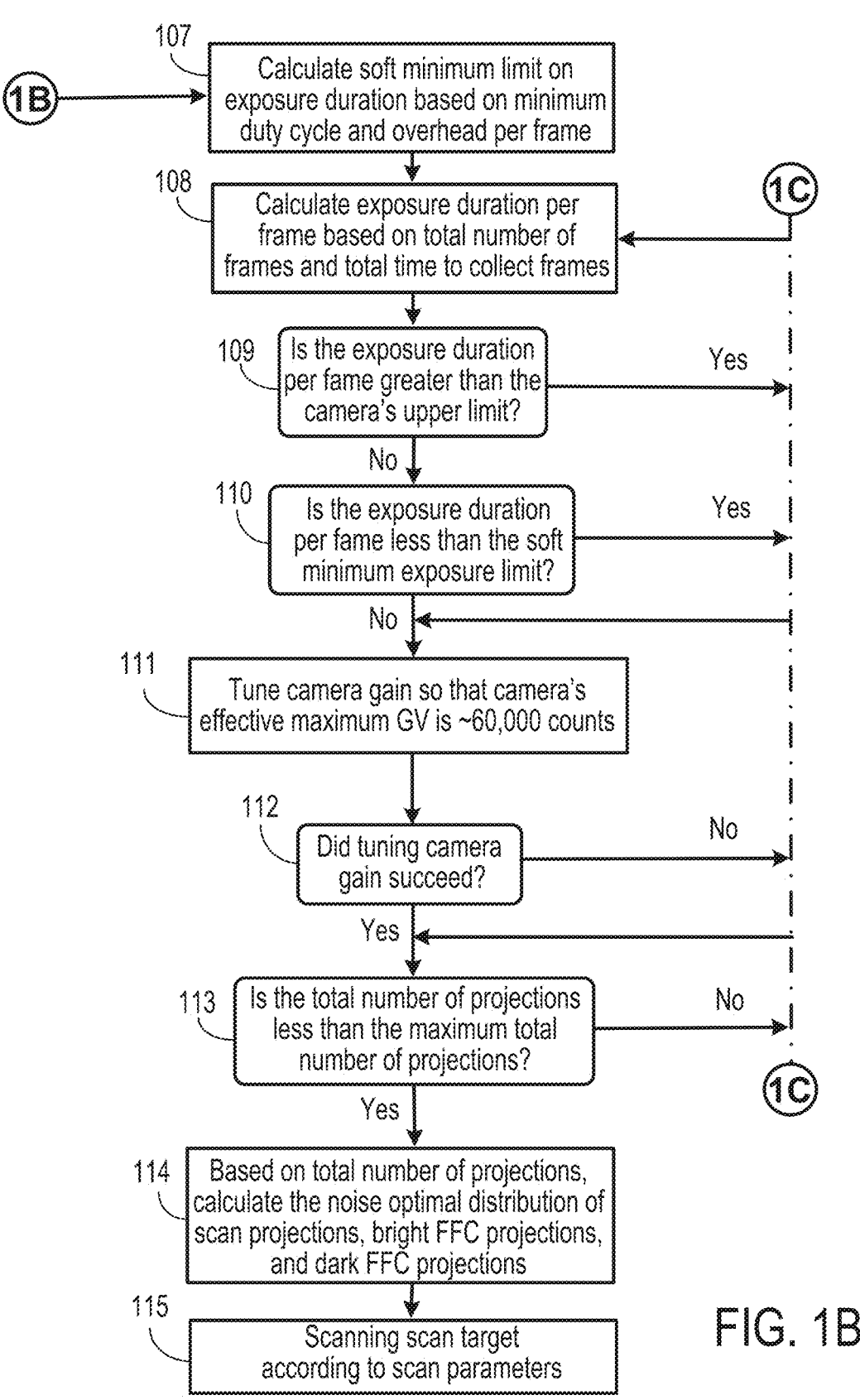
Figure 1C:
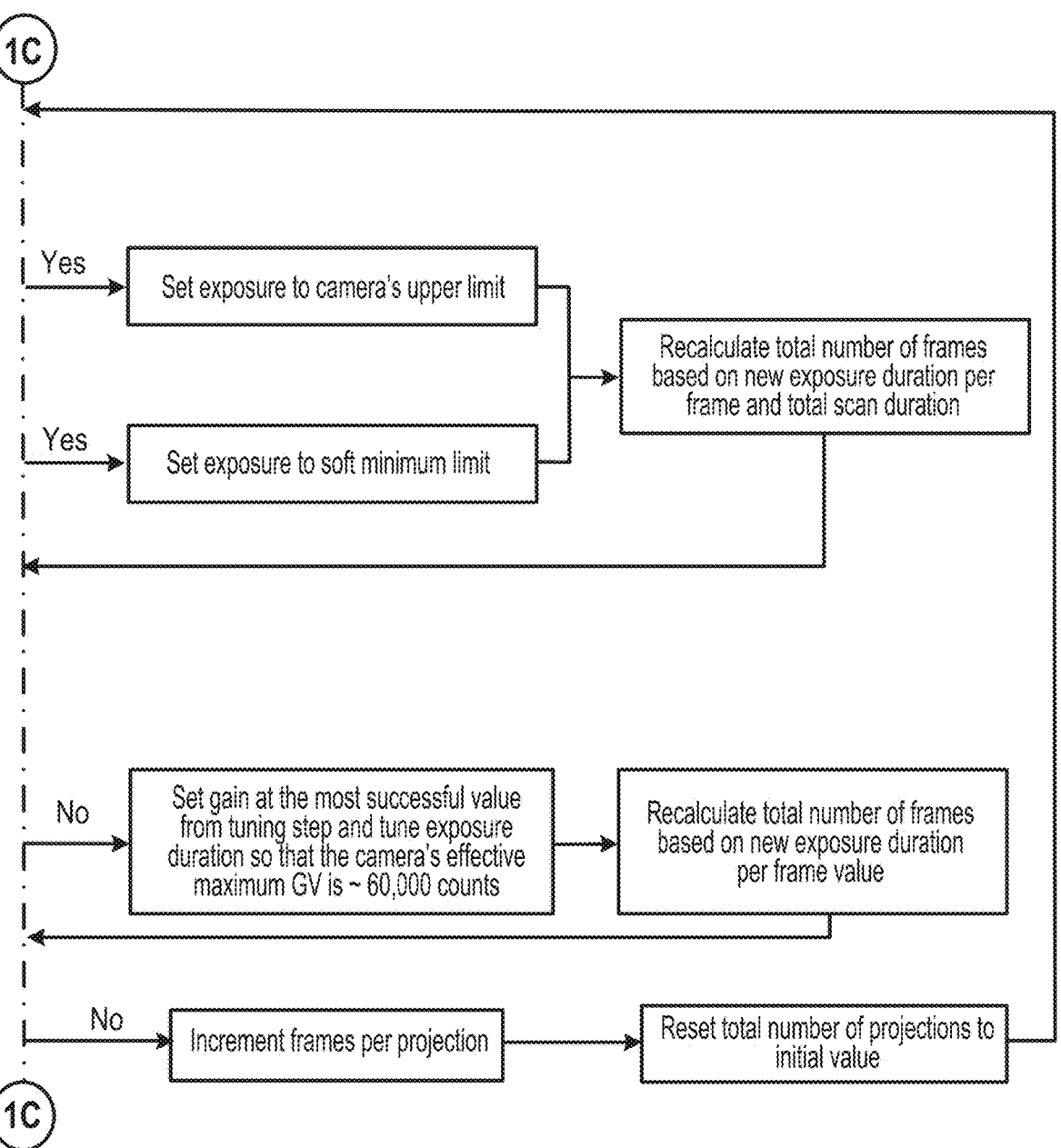
Figure 3:
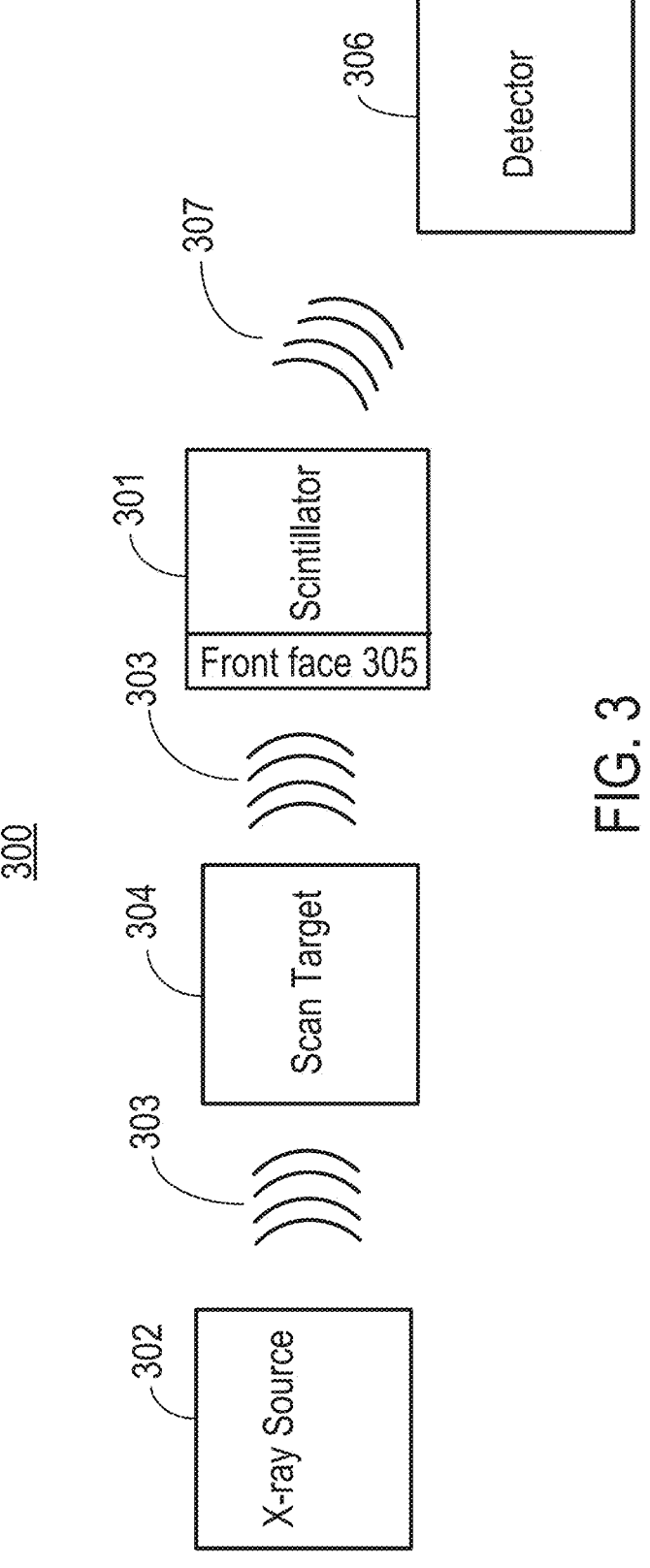
FIG. 3 illustrates an example of an x-ray imaging system according to certain example embodiments.

FIGS. 1(a)-(c) illustrate an example of a flow diagram of a method that may be performed by a scanning device, for example, CT scanning device 300 illustrated in FIG. 3, according to various example embodiments. In some example embodiments, the scanning device may be configured to perform CT scans by obtaining and combining a plurality of x-ray images (i.e., frames).

At 100, the method may include receiving input from a user associated with scan parameters to begin the scanning process. For example, the received input may include any combination of scan duration and scan quality (e.g., fine feature resolvability, multi-material determination).

At 101, the method may include setting at least one of a source beam energy parameter to a predefined source beam energy maximum value (e.g., 120 kV, 190 kV), which may be the maximum beam energy achievable by the scanning device.

Additionally or alternatively, the method may include setting a source beam current parameter to a predefined source beam current maximum value achievable by the scanning device (e.g., 0.3 mA, 0.5 mA, 0.75 mA) and/or setting a filtration parameter to a minimum value (e.g., 0). As an example, the scanning device may include x-ray sources with a static focal spot size and/or x-ray sources with a dynamic focal spot size. In general, an x-ray source with a static focal spot will have a focal spot that does not change as a function of source parameters. The focal spot size of a source with a dynamic focal spot will increase as x-Ray power is increased. Thus, with respect to a static focal spot size, increasing the source beam current may not yield a scan performance penalty. In contrast, a dynamic focal spot size may have a larger focal spot with higher x-ray power. Thus, with a preselected beam energy, increasing the beam current may cause an increase in focal spot size.

At 102, the method may include setting a camera gain parameter (i.e., amplification) to a high value based upon a predetermined threshold value (e.g., 30 dB, 40 dB, 50 dB). As an example, the camera gain parameter may be set such that the $98^{th}$ percentile intensity of the scanning device may fall between 57,000 and 63,000 counts (i.e., 16-bit image ranging from 0 counts to 65,535 counts). Additionally or alternatively, the method may include setting the camera exposure parameter based upon a predetermined threshold value; for example, the camera exposure parameter may be set to 0.5 seconds or less.

At 103, the method may include automatically positioning and magnifying an image of a scan target. In some example embodiments, the positioning of the scan target may be performed using an object detection algorithm, such as a machine-learning (ML) based bounding box algorithm. The ML bounding box algorithm may set the magnification and positioning of the image of the scan target such that the boundaries of the scan target do not extend outside of the scanning device.

At 104, the method may include determining a material composition of the scan target, that is, whether the scan target is mono-material or multi-material (e.g., 100% aluminum; 45% tin, 15% carbon, 40% iron). In one example, the scanning device may receive user input that specifies whether the material composition of the scan target is mono-material or multi-material. Alternatively, the scanning device may determine whether the material composition of the scan target is mono-material or multi-material automatically using a material detection algorithm Specifically, the material detection algorithm may include a series of data collection steps, wherein the scan target is rotated a predetermined minimum number of times (e.g., 2), and the scanning device captures images of the scan target at varying levels of filtration (e.g., 2) or beam energy. Once the images have been captured, the scanning device may classify the scan target based upon a scatter plot of an unfiltered grey value (GV) of all pixels plotted against filtered GVs of all pixels, such as those illustrated in FIGS. 2(a)-2(b).

Figure 2A:
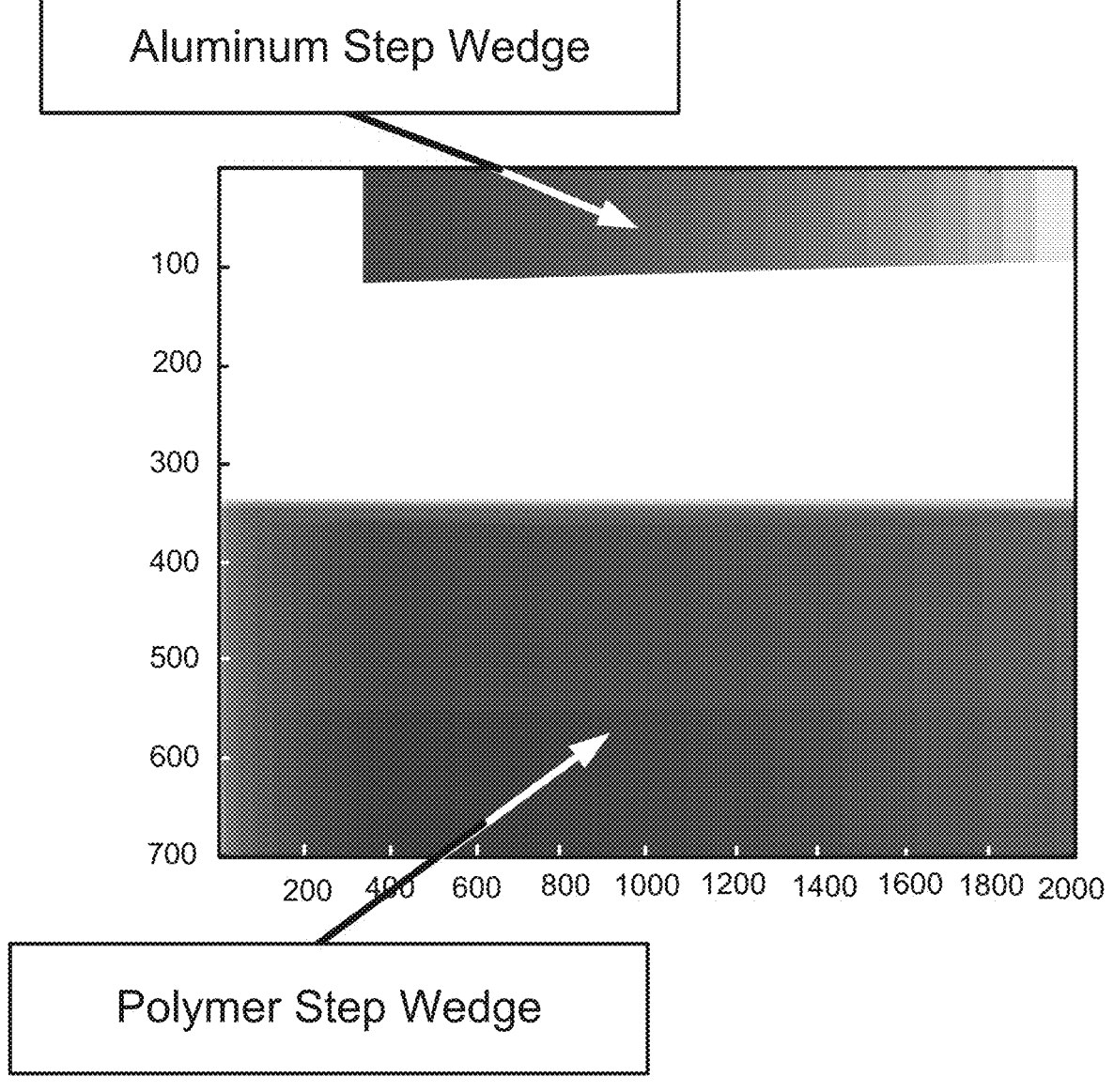
FIG. 2(a) illustrates a radiograph of a single image capture of an aluminum step wedge (top) and a polymer step wedge (bottom) according to some example embodiments.

FIG. 2(a) illustrates a radiograph of a single image capture of an aluminum step wedge (top) and a polymer step wedge (bottom); in this example, a step wedge may be a wedge having several steps of differing thicknesses. The radiograph was captured using x-ray source beam energy set to a relatively high value and low value. After capturing two images, each pixel in the radiograph may have two recorded GVs: one GV corresponding with the high x-ray source beam energy value, and another GV corresponding with the low x-ray source beam energy value.

Figure 2B:
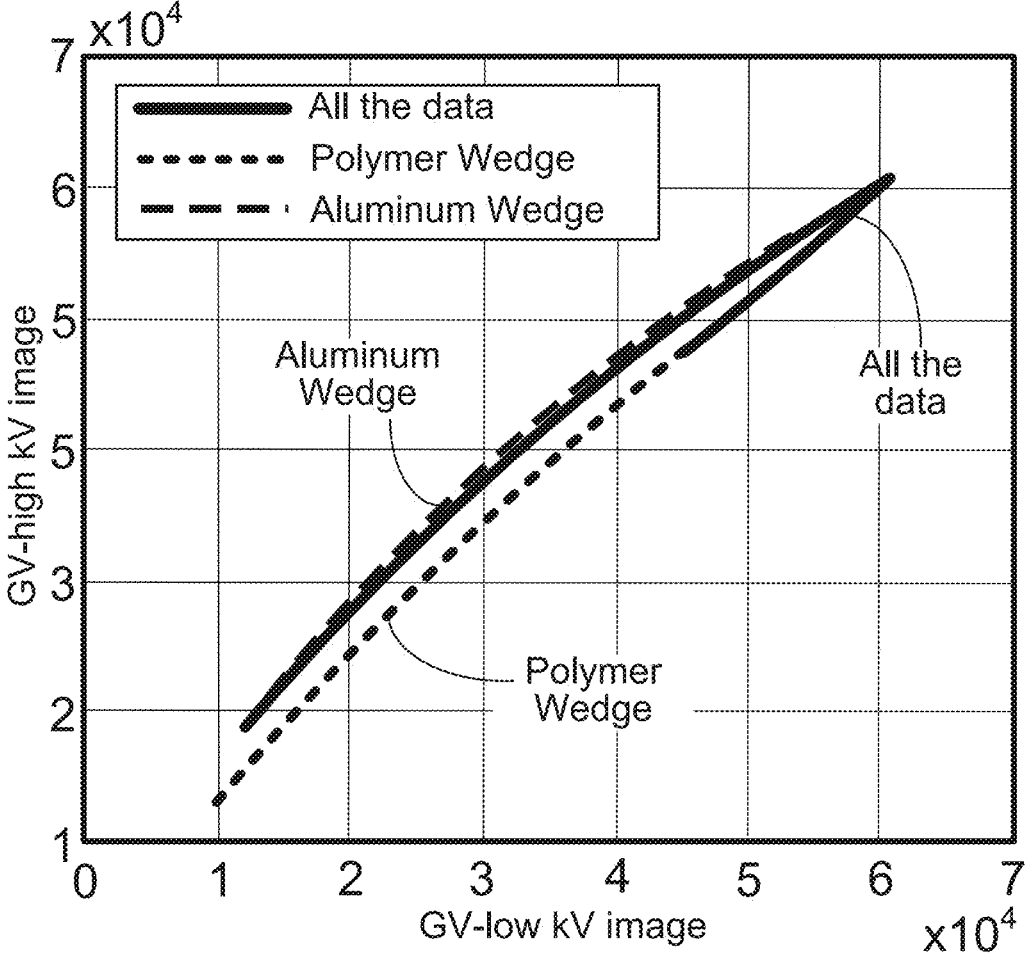
FIG. 2(b) illustrates an example of a scatter plot of a scene with multi-material scan targets that differentiates between different materials.

The scatter plot shown in FIG. 2(b) may be generated by plotting a point for every pixel where its x-value is the GV value when the beam energy is below a threshold, and its y-value is the GV value when the beam energy is above a threshold (e.g., maximum beam energy (130 kV) for the high value and half the maximum beam energy (65 kV) for the low value). As a result, if the material composition of a scanned part (i.e., step wedge) is mono-material, then all of the pixels may form a single, compact curve on the scatter plot. Alternatively, if a scanned part is multi-material, the scatter plot may depict multiple well-defined curves (as shown in FIG. 2(b)), or, if different materials overlap each other, the scatter plot may depict a single, thick curve. In this way, the thickness of the scatter plot curve may indicate the range of materials composing the scanned part. For example, the scattered points may cluster into a single curve for a mono-material scan target; two curves for a two-material scan target; three curves for a three-material scan target; etc. In response, the method may include setting an operation parameter (e.g., a GV threshold) to a first predetermined GV value (e.g., 7,000 counts) if the scan target is mono-material, and, alternatively, upon determining that the scan target is multi-material, setting the GV threshold to a second predetermined GV value (e.g., 15,000 counts). In some example embodiments, the first/second GV thresholds may be related to an intensity, such as pixel intensity or pixel brightness; for example, with monochrome 16-bit images, each pixel may be 16-bits corresponding with intensity, wherein a value of 0 may be pure black, and a value of 65535 may be pure white.

At 105, the method may include determining whether a minimum effective GV is greater than the GV threshold. The minimum effective grey value may be a representative value for how dark the detector's grey value may be throughout the scan, and may vary based on the scanned part and scanner setup conditions (e.g., 2,000-45,000 grey value counts). For example, the minimum effective GV may be determined by the scanning device rotating the scan target on a turntable within the scanning device, taking images of the scan target from multiple angles, and calculating the $1^{st}$ percentile of GVs recorded from all images, thereby avoiding false signals from noise and/or defective pixels.

In some example embodiments, the method may further include, upon determining that the minimum effective GV is not greater than the GV threshold, determining that the filtration parameter (e.g., 0 mm, 0.5 mm, 1 mm, 1.5 mm, 2.5 mm, and 6 mm) is not set to a maximum filtration value (e.g., 6 mm), and incrementally increasing a filtration thickness parameter and/or adjusting the camera exposure parameter such that an effective maximum GV is a predetermined value (e.g., 60,000 counts).

Upon determining that the filtration parameter is set to the maximum filtration value, or determining that the minimum effective GV is greater than the GV threshold at 105, the method may further include, at 106, determining whether a focal spot is static or dynamic (as discussed above at 101), which may be based upon the hardware capabilities of the scanning device. Based upon the determination that the focal spot is dynamic, the method may further include decreasing the source beam current parameter until $$\text{Focal spot size} \le \frac{\text{Pixel size}}{\text{Magnification} - 1}$$

is satisfied.

At 107, the method may further include calculating an exposure duration soft minimum limit, which may be based, at least in part, on a minimum duty cycle and/or overhead per frame. In some example embodiments, the exposure duration soft minimum limit may be set to an exposure duration that yields a 60% duty cycle, wherein $$\text{Duty cycle} = \frac{\text{Exposure duration}}{\text{Exposure duration} + \text{overhead}},$$

and thus, $$\text{Exposure duration} = \text{Overhead} * \frac{\text{Duty cycle}}{1 - \text{Duty cycle}}.$$

For example, if the minimum duty cycle is 0.6, and the projection overhead is 1 second, then the soft limit on the minimum exposure duration may be $$1 \times \frac{0.6}{1 - 0.6} = 1.5$$

seconds. Similarly, if the minimum duty cycle is 0.8 and the overhead is 2 seconds, then the minimum exposure duration may be $$2 \times \frac{0.8}{1 - 0.8} = 8$$

seconds.

At 108, the method may include calculating an exposure duration per frame based on a total number of frames and/or a total time elapsed while collecting the frames. As an example, the exposure duration per frame may be calculated according to $$\text{Exposure duration per frame} =$$
$$\frac{\text{Total scan duration}}{\text{Total number of frames}} - \text{Overhead per frame}.$$

At 109, the method may include determining whether the exposure duration per frame is greater than a maximum exposure duration per frame threshold. If the exposure duration per frame is greater than the maximum exposure duration per frame threshold, the method may include setting the exposure to an upper limit of the scanning device, and recalculating the total number of frames based on at least one new exposure duration per frame and total scan duration, which may be similar to the calculation discussed above at 108.

If the exposure duration per frame is not greater than the maximum exposure duration per frame threshold, the method may include determining, at 110, whether the exposure duration per frame is less than a minimum exposure limit threshold. If the exposure duration per frame is less than a minimum exposure limit threshold, the method may include setting exposure to the soft minimum exposure limit threshold, and, again, recalculating the total number of frames based on at least one new exposure duration per frame and total scan duration.

In response to determining that the exposure duration per frame is not less than the soft minimum exposure limit, or recalculating the total number of frames based on at least one new exposure duration per frame and total scan duration, the method may include, at 111, tuning the camera gain to set the effective maximum GV to an effective maximum GV threshold (e.g., 60,000 counts).

At 112, the method may include determining whether the camera gain satisfies the effective maximum GV. For example, if the effective maximum GV is ~60,000 counts, the method may determine whether the required gain to achieve ~60,000 counts is less than the minimum gain (0 dB) and/or greater than the maximum gain (60 dB).

In some example embodiments, if the camera gain does not satisfy the effective maximum GV, the method may include setting gain as the nearest in-range gain (e.g., if a particular setup would require a gain of 65 dB, and the maximum gain is 60 dB, the gain may be set to 60 dB) from step 111 above and/or setting tune exposure duration such that the effective maximum GV of the scanning device reaches a predetermined value (e.g., 60,000 counts). In general, exposure time may be proportional to effective maximum GV. Subsequently, the total number of frames may be recalculated based on the new exposure duration per frame value.

At 113, the method may include determining whether a total number of projections is less than a maximum total number of projections threshold. If the total number of projections is less than the maximum total number of projections threshold, the method may include incrementing the number of frames per projection, resetting the total number of projections to an initial value (e.g., 930), and recalculating an exposure duration per frame based on a total number of frames and/or a total time elapsed while collecting the frames at 108.

At 114, if the total number of projections is less than the maximum total number of projections threshold, the method may include calculating any of a noise optimal distribution of scan projections; bright flat-field correction (FFC) projections; and dark FFC projections based on the total number of projections. In some example embodiments, reconstruction noise may be minimized when FFC projections=($\sqrt{\text{Total}}$ number of projections)−1. Dark FFC projections may also be set to zero.

At 115, the method may include the scanning device scanning a scan target according to the determined parameters. The determined parameters may be held constant throughout the scan.

FIG. 3 illustrates an example of CT scanning device 300, which may be configured to perform CT imaging. CT scanning device 300 may include scintillator 301, and x-ray source 302 configured to emit x-rays 303 through scan target 304 and onto front face 305 of scintillator 301. CT scanning device 300 may further include detector 306 configured to detect at least one fluorescence signal 307 (i.e., visible light) from scintillator 301. In various example embodiments, detector 306 may be aimed directly at a back face of scintillator 301, or scintillator 301 may be oriented perpendicularly with x-ray source 302.

In some example embodiments, scintillator 301 may include a substrate layer, which may be made of any of polycarbonate, polyacrylate, polyethylene terephthalate (PET), and barrier films comprising metal oxide.

In certain example embodiments, x-ray source 302 may be at least one of a sealed tube-based x-ray source, an open tube-based x-ray source, a cold-cathode x-ray source, a rotating anode x-ray source, a stationary anode x-ray source, a liquid metal anode x-ray source, and triboluminescent x-ray source.

Scan target 304 may include any of inorganic materials, organic materials, metals, plastics, composites, carbon, non-carbon, multi-component, and multi-layer parts.

In certain example embodiments, detector 306 may include any combination of a complementary metal-oxide-semiconductor (CMOS) digital camera sensor, a red-green-green-blue (RGGB) Bayer filter, an optical camera, a monochromatic optical camera, a back-side-illuminated sensor, a front-side-illuminated sensor, a charge-coupled device (CCD) detector, a photodiode, X-ray flat panel detector. In certain example embodiments, detector 306 may be configured to detect fluorescence signals 307 from the front/rear face of the scintillator 301.

Any of the devices of CT scanning device 300 may include at least one processor, which may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices of CT scanning device 300. The memory may be fixed or removable. The memory may include computer program instructions or computer code contained therein. Memory may independently be any suitable storage device, such as a non-transitory computer-readable medium. The term "non-transitory," as used herein, may correspond to a limitation of the medium itself (i.e., tangible, not a signal) as opposed to a limitation on data storage persistency (e.g., random access memory (RAM) vs. read-only memory (ROM)). A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

The processors and memories may be configured to provide means corresponding to the various blocks of FIGS. 1-3. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

The memory and the computer program instructions may be configured, with the processor for the particular device, to cause a hardware apparatus, such as UE, to perform any of the processes described above (i.e., FIGS. 1-3). Therefore, in certain example embodiments, a non-transitory computer-readable medium may be encoded with computer instructions that, when executed in hardware, perform a process such as one of the processes described herein. Alternatively, certain example embodiments may be performed entirely in hardware.

In certain example embodiments, an apparatus may include circuitry configured to perform any of the processes or functions illustrated in FIGS. 1-3. As used in this application, the term "circuitry" may refer to one or more or all of the following: (a) hardware-only circuit implementations (such as implementations in only analog and/or digital circuitry), (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In some example embodiments, CT scanning device 300 (and any of the devices in CT scanning device 300) may include means for performing a method, a process, or any of the variants discussed herein. Examples of the means may include one or more processors, memory, controllers, transmitters, receivers, and/or computer program code for causing the performance of the operations.

In various example embodiments, CT scanning device 300 (and any of the devices in CT scanning device 300) may be controlled by memory and a processor to adjust at least one operation parameter based upon a material composition of a scan target, calculate an exposure duration parameter per frame based on a total number of frames and a total time elapsed while collecting the frames, and collect at least one x-ray frame of the scan target based upon the at least one adjusted operation parameter and the calculated exposure duration parameter.

Certain example embodiments may be directed to an apparatus that includes means for performing any of the methods described herein including, for example, means for adjusting at least one operation parameter based upon a material composition of a scan target, calculating an exposure duration parameter per frame based on a total number of frames and a total time elapsed while collecting the frames, and collecting at least one x-ray frame of the scan target based upon the at least one adjusted operation parameter and the calculated exposure duration parameter.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof. One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

PARTIAL GLOSSARY

CMOS Complementary metal-oxide-semiconductor
CT Computed Tomography
dB Decibel
FFC Flat-Field Correction
GV Grey Value
kV Kilovolt
mA Milliamp
ML Machine-Learning
PET Polyethylene Terephthalate
RGGB Red-green-green-blue

What is claimed is:

1. A method, comprising:
adjusting, by a computed tomography scanning device, at least one operation parameter comprising a grey value threshold based upon a material composition of a scan target; and
collecting, by the computed tomography scanning device, at least one x-ray frame of the scan target based upon the at least one adjusted operation parameter.

2. The method of claim 1, further comprising:
setting, by the computed tomography scanning device, at least one of a source beam energy parameter to a predefined maximum value.

3. The method of claim 2, wherein the predefined maximum value comprises a maximum beam energy achievable by the computed tomography scanning device.

4. The method of claim 1, further comprising:
setting, by the computed tomography scanning device, a camera gain parameter to a high value based upon a predetermined threshold value.

5. The method of claim 4, wherein the camera gain parameter is associated with amplification.

6. The method of claim 1, further comprising:
positioning and magnifying, by the computed tomography scanning device, an image of the scan target according to an object detection algorithm.

7. The method of claim 1, further comprising:
determining, by the computed tomography scanning device, the material composition of the scan target comprising determining whether the scan target is mono-material or multi-material.

8. The method of claim 1, further comprising:
determining, by the computed tomography scanning device, whether a minimum effective grey value associated with an image of the scan target is greater than the grey value threshold.

9. The method of claim 1, further comprising:
upon determining that a filtration parameter is set to a maximum filtration value, or that a minimum effective grey value is greater than the grey value threshold, determining, by the computed tomography scanning device, whether a focal spot is static or dynamic.

10. The method of claim 1, further comprising:
calculating, by the computed tomography scanning device, a source beam current parameter until $$\text{Focal spot size} \leq \frac{\text{Pixel size}}{\text{Magnification} - 1}$$

is satisfied.

11. The method of claim 1, further comprising:
calculating, by the computed tomography scanning device, an exposure duration per frame based on at least one of a total number of frames and a total time elapsed while collecting the frames.

12. The method of claim 11, further comprising:
determining, by the computed tomography scanning device, whether the exposure duration per frame is greater than a maximum exposure duration per frame threshold.

13. The method of claim 12, further comprising:
in response to determining that the exposure duration per frame is not greater than the maximum exposure duration per frame threshold, determining, by the computed tomography scanning device, whether the exposure duration per frame is less than a minimum exposure limit threshold.

14. The method of claim 12, further comprising:
in response to determining that the exposure duration per frame is greater than the maximum exposure duration per frame threshold,
setting, by the computed tomography scanning device, the exposure duration per frame to an upper limit of the computed tomography scanning device, and
calculating the total number of frames based on at least the exposure duration per frame and a total scan duration.

15. The method of claim 1, further comprising:
determining, by the computed tomography scanning device, whether a total number of projections is less than a maximum total number of projections threshold.

16. The method of claim 15, further comprising:
in response to determining that the total number of projections is less than the maximum total number of projections threshold, calculating, by the computed tomography scanning device, any of a noise optimal distribution of scan projections, bright flat-field correction projections, and dark flat-field correction projections based on the total number of projections.

17. A system comprising:

a data processing apparatus including at least one processor; and a non-transitory computer-readable medium encoding instructions configured to cause the data processing apparatus to perform operations comprising:

setting at least one scan parameter comprising a source beam energy parameter of a computed tomography scanning device to a predefined maximum value; and scanning a scan target according to the at least one scan parameter;

wherein the at least one scan parameter comprises a source beam current parameter, and the predefined maximum value comprises a predefined source beam current maximum value achievable by the computed tomography scanning device, and wherein the operations further comprise:

determining that a filtration parameter is set to a maximum filtration value or determining that a minimum effective grey value is greater than a grey value threshold;

in response to determining that the filtration parameter is set to the maximum filtration value or determining that the minimum effective grey value is greater than the grey value threshold, determining that a focal spot of the computed tomography scanning device is dynamic; and in response to determining that the focal spot of the computed tomography scanning device is dynamic, source beam decreasing the current parameter until $$\text{Focal spot size} \leq \frac{\text{Pixel size}}{\text{Magnification} - 1}$$

is satisfied.

18. The system of claim 17, wherein the predefined maximum value comprises a maximum beam energy achievable by the computed tomography scanning device.

19. The system of claim 17, wherein the operations comprise:

adjusting a grey value threshold based upon a material composition of the scan target.

20. A non-transitory computer-readable medium encoding instructions operable to cause a data processing apparatus to perform operations comprising:

obtaining a total number of projections;

calculating a noise optimal distribution of scan projections and flat-field correction projections based on the total number of projections, wherein the noise optimal distribution is calculated for reduced noise; and obtaining, using a computed tomography scanning device, at least one x-ray frame of a scan target based upon the distribution of the scan projections and the flat-field correction projections.

21. The computer-readable medium of claim 20, wherein the flat-field correction projections comprise at least one of bright flat-field correction projections and dark flat-field correction projections.

22. The computer-readable medium of claim 21, wherein calculating the noise optimal distribution comprises determining a number of scan projections, a number bright flat-field correction projections, and a number of dark flat-field correction projections for minimized reconstruction noise.

23. The computer-readable medium of claim 20, wherein the operations comprise:

determining whether the total number of projections is less than a maximum total number of projections threshold; and in response to determining that the total number of projections is less than the maximum total number of projections threshold, calculating the noise optimal distribution.

24. The computer-readable medium of claim 23, wherein the operations comprise:

obtaining a second total number of projections;

in response to determining that the second total number of projections is not less than the maximum total number of projections threshold, adjusting a number of frames per projection;

resetting the second total number of projections to an initial value; and calculating an exposure duration per frame.

\* \* \* \* \*